US008387755B2

(12) United States Patent
Marek (10) Patent No.: US 8,387,755 B2
(45) Date of Patent: Mar. 5, 2013

(54) LUBRICATION SYSTEM AND METHOD OF CONTROL

(75) Inventor: John P. Marek, Sugar Grove, IL (US)

(73) Assignee: Caterpillar Inc., Peoria, IL (US)

( * ) Notice: Subject to any disclaimer, the term of this patent is extended or adjusted under 35 U.S.C. 154(b) by 1072 days.

(21) Appl. No.: 11/897,306

(22) Filed: Aug. 30, 2007

(65) Prior Publication Data
US 2009/0057063 A1   Mar. 5, 2009

(51) Int. Cl.
*F16N 27/00* (2006.01)

(52) U.S. Cl. ............. 184/7.4; 184/6; 184/6.1; 184/6.19; 184/6.4; 184/7.3; 184/50.2; 184/55.2; 60/449; 60/450; 60/452; 60/456; 60/459; 60/468; 60/487; 60/489; 137/9; 137/883; 137/884; 137/885; 700/282; 700/306

(58) Field of Classification Search ............. 184/7.4, 184/29, 32, 34, 39, 42, 45.1, 6.4, 6.28, 55.1, 184/50.2, 55.2, 39.1, 50.1, 108, 6.1, 36, 6.23; 137/883–884, 17, 565, 505.38, 870; 222/389, 222/444; 417/226, 385, 388, 401; 700/282, 700/306; 60/452; 340/450, 438, 428, 679, 340/505, 184; 425/107, 43, 157, 159, 160; F16N 7/38, 27/00
See application file for complete search history.

(56) References Cited

U.S. PATENT DOCUMENTS

| | | | | | |
|---|---|---|---|---|---|
| 2,240,158 | A | * | 4/1941 | Hillis | 184/7.4 |
| 3,664,462 | A | * | 5/1972 | Smith, Sr. | 184/7.4 |
| 4,520,902 | A | | 6/1985 | Snow | |
| 4,787,479 | A | | 11/1988 | Ostermeyer | |
| 4,990,076 | A | * | 2/1991 | Lynch et al. | 422/112 |
| 5,129,230 | A | * | 7/1992 | Izumi et al. | 60/452 |
| 5,381,874 | A | * | 1/1995 | Hadank et al. | 184/6.4 |
| 5,711,354 | A | | 1/1998 | Siegele et al. | |
| 5,823,295 | A | | 10/1998 | Griffith | |
| 5,971,107 | A | | 10/1999 | Stitz | |
| 6,305,404 | B1 | | 10/2001 | Steiger | |
| 6,571,626 | B1 | | 6/2003 | Herford | |
| 6,622,824 | B2 | | 9/2003 | Roehrborn | |

(Continued)

FOREIGN PATENT DOCUMENTS

GB   2055433 A  *  3/1981

OTHER PUBLICATIONS

Lincoln, Centro-Matic Automated Lubrication Systems, Form 442832 (Dec. 2005), Copyright 2005, Lincoln Industrial Corp., One Lincoln Way, St. Louis, MO 63120-1578.

*Primary Examiner* — Robert A Siconolfi
*Assistant Examiner* — San Aung
(74) *Attorney, Agent, or Firm* — Finnegan, Henderson, Farabow, Garrett & Dunner LLP (57) ABSTRACT

A lubrication system is provided that includes a pump operatively connected to one or more supply lines for delivery of a lubricant, the system including a first pressure sensor associated with the supply line at a first position, and a second pressure sensor associated with the supply line at a second position downstream of the first position and pump, a controller configured to receive pressure signals and control operation of the pump based upon the pressure differential between the pressures at the first position and second position. The pressure differential may be employed to determine when a pressure at a third position downstream of the second position has been achieved. At least one of the pressure sensors may be positioned adjacent to the pump, the controller further being operable to deactivate the pump in the event that a maximum pump pressure has been met.

20 Claims, 7 Drawing Sheets

U.S. PATENT DOCUMENTS

| | | |
|---|---|---|
| 6,629,627 B1 | 10/2003 | Siegele et al. |
| 6,776,900 B2 | 8/2004 | Mazurek et al. |
| 6,810,998 B2 | 11/2004 | Conley |
| 7,159,606 B2 | 1/2007 | Paluncic et al. |
| 7,513,393 B2 | 4/2009 | Kotyk |
| 2005/0109682 A1 | 5/2005 | Mazurek et al. |
| 2009/0101443 A1* | 4/2009 | Kawai .................. 184/7.4 |

* cited by examiner

LUBRICATION SYSTEM AND METHOD OF CONTROL

TECHNICAL FIELD

This disclosure relates generally to a machine lubrication system, and more particularly to a lubrication system that includes two or more pressure sensors disposed at separate locations along a supply line, the signals from these sensors being processed by a controller configured to control system operation based upon the pressure differential between the positions associated with the sensors. The controller may be further configured to determine when a desired pressure at a position downstream of the pressure sensors has been achieved based upon this pressure differential.

BACKGROUND

Many mobile machines, such as off-highway mining trucks, loaders, motor graders, material handlers and hydraulic excavators, include numerous moving parts that require proper lubrication to prevent premature failure. Critical areas may include, for example, wheel bearings, articulation joints and linkage joints. In many applications, these critical areas must be frequently lubricated, e.g. it may be desirable to lubricate as frequently as every 5-10 minutes. Obviously, if the machine must be stopped and lubricated manually every ten minutes, this would result in tremendous downtime and loss of productivity.

To address these needs, various automatic systems have been developed to provide lubrication during machine operation. Generally, such lubrication systems include a reservoir for lubricating material, a pump, supply lines, and one or more injectors arranged to deliver lubricant through feed lines to each of the lubrication points.

Figure 1:
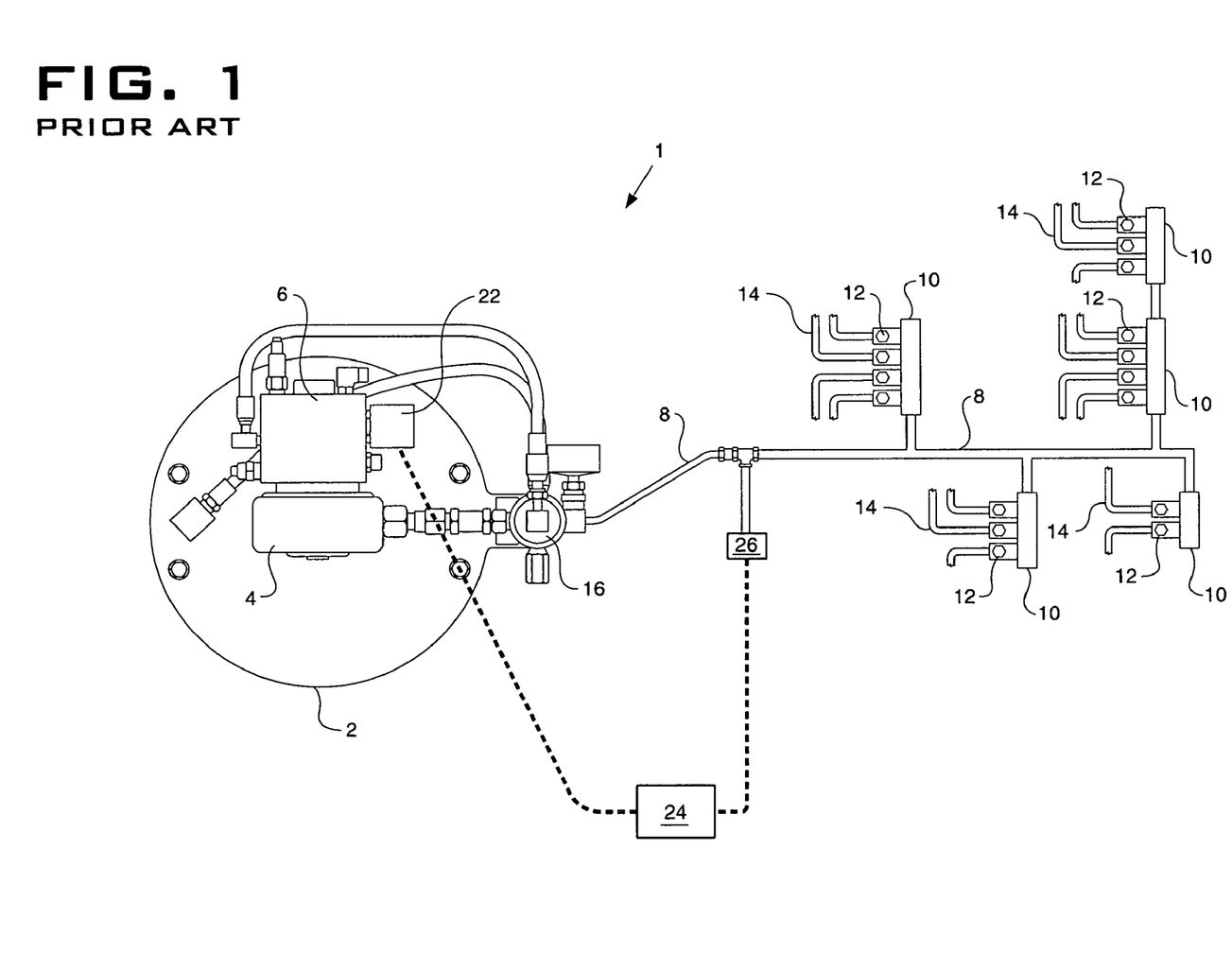
FIG. 1 is a diagrammatic view of a prior art lubrication system.

For example, a known automatic lubrication system is shown in FIG. 1. This system 1 includes a tank 2 which is fluidly connected to a pump 4 driven by a hydraulic motor 6. Lubricant is driven by the pump 4 through a supply line 8 to a number of downstream injector banks 10, each injector bank having two or more individual injectors 12 which supply lubricant through feed lines 14 to the areas in need of lubrication.

The hydraulic motor 6 is primarily controlled by a solenoid valve 22, which also controls a vent valve 16 disposed in the supply line 8 adjacent to the pump 4. The solenoid valve 22 is actuated automatically through a controller 24, but may also be manually actuated by an operator through controls typically located in the operator's cab.

In many applications, such as those that employ pressure-actuated injectors, it is necessary to control operation of the pump to achieve specific pressures at various points in the supply line. Such injectors, for example, are sold by Lincoln Industrial Corporation under the designation Series SL-1. These injectors have the benefit of supplying a metered quantity of lubricating fluid to the lubrication point with which the injector is associated, and are adjustable in that regard. However, these injectors are only fully actuated when pressure in the supply line at the injector reaches a specific level, after which the pressure in the supply line must be relieved to reset the injector.

To achieve the necessary pressure for firing the injectors, the controller 24 may operate based on a timer, causing the pump to operate for a duration that is expected to allow the necessary pressure to be reached at all of the injectors. That is, the controller is adapted to actuate the motor, pump and/or valve mechanisms to supply lubricant for a set duration, e.g. 120 seconds, every 10 minutes. For more precise control, known systems have included a downstream pressure sensor 26 in communication with the controller 24, and in connection with a timer, to provide a better estimation of the pressure at the injectors. For example, the pressure at a downstream location is monitored, and when a desired pressure is obtained at the sensor position, the controller adds, for example, 10 seconds, after which it is assumed that the necessary pressure has been obtained at the injectors, and, therefore, that the injectors have fully fired.

In the optimal situation, the pressure sensor would be placed directly at the location of the injector. However, due to the typically harsh environments in which the machines employing these systems tend to operate and other design considerations, it has typically proven impractical to place a pressure sensor far enough downstream to obtain the most accurate reading. For example, on a wheel loader or hydraulic excavator, placing a pressure sensor on the linkage or boom assembly, particularly near the bucket or other work implement, simply is not a viable option due to damage that will inevitably occur to the sensor.

As a result, the pressure sensors of known systems are typically placed far from the location of the furthest injectors, with a delay built into the controls to estimate when the downstream pressure has been achieved. For example, in the prior art system 1 just described, pressure sensor 26 is located on the vehicle frame, while the furthest injectors are located on the machine linkage assembly.

While better than a pure timer mechanism, known systems employing a single pressure sensor are still prone to inaccuracy. In particular, this occurs when the viscosity of the lubricant has been increased. This typically occurs, for example, when operating in low temperature conditions, or, more often, as the result of operators or maintenance personnel using an improper lubricant. In either case, the single sensor system may indicate a successful cycle where the downstream pressure has not actually been achieved. Thus, the system fails to lubricate the necessary components, causing premature failure and potential damage to the machine.

Another problem associated with conventional lubrication systems occurs when the pump pressure exceeds a maximum operating pressure. A pressure regulator is typically provided to ensure that the pump pressure does not exceed a threshold level. However, the pressure regulator may fail due to either improper adjustment or malfunctions. Excessive pressure may be caused, for example, by variation in the hydraulic supply pressure and flow to the hydraulic motor, as well as with variation in the performance of a pressure reducing valve between the hydraulic supply and the hydraulic motor. Moreover, the overall pump efficiency as a function of lubricant type, operating temperature, and wear or break-in may not be taken into account by a system relying on a pressure regulator alone.

It is therefore desirable to provide a better system for controlling such lubrication systems, and, in particular, a more precise method of determining the pressure at the injectors for improved efficiency and performance. The present disclosure is directed to overcoming one or more of the problems set forth above.

SUMMARY

In one aspect, the present disclosure provides a lubrication system including a pump operatively connected to a supply line to deliver a lubricant. The system includes a first pressure sensor associated with the supply line at a first position, and a second pressure sensor associated with the supply line at a second position downstream of the pump and the first pressure sensor position. A controller is configured to receive pressure signals from the first and second pressure sensors, and to control operation of the pump based upon a differential pressure between the pressures at the first and second positions.

In another aspect, a method is provided for operation of a lubrication system pump that includes sensing a first pressure at a first position of a supply line, sensing a second pressure at a second position of the supply line downstream of the pump and first position, and generating a control signal from a controller to operate the pump based upon a differential pressure between the first and second pressures.

In yet another aspect, a machine is provided that includes a frame and a linkage, such as a wheel loader or excavator linkage, extending from the frame. A pump is connected to a supply line with a first portion that extends along the frame, and a second portion that extends along the linkage. A first pressure sensor is associated with the first portion of the supply line, and generates a first pressure signal indicative of a first pressure; and a second pressure sensor is associated with the supply line at a second position downstream of the pump and first position, and generates a second pressure signal indicative of a second pressure. A controller is configured to receive the first and second pressure signals and to control operation of the pump based upon the differential pressure between the first and second pressures.

These and other aspects and advantages of the present disclosure will become apparent to those skilled in the art upon reading the following detailed description in connection with the drawings and appended claims.

DETAILED DESCRIPTION

Figure 2:
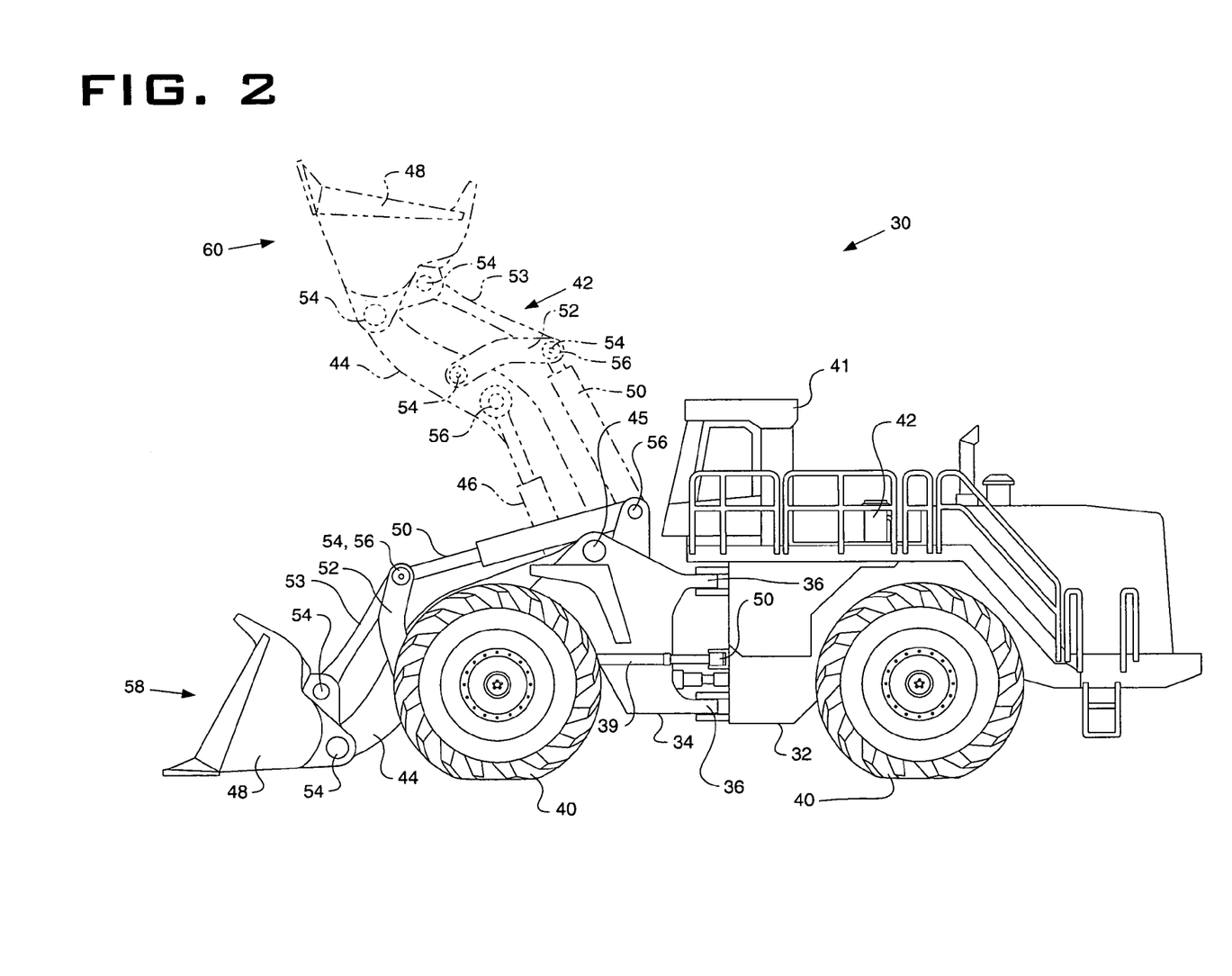
FIG. 2 is a side view of one type of machine having a lubrication system.
Figure 3:
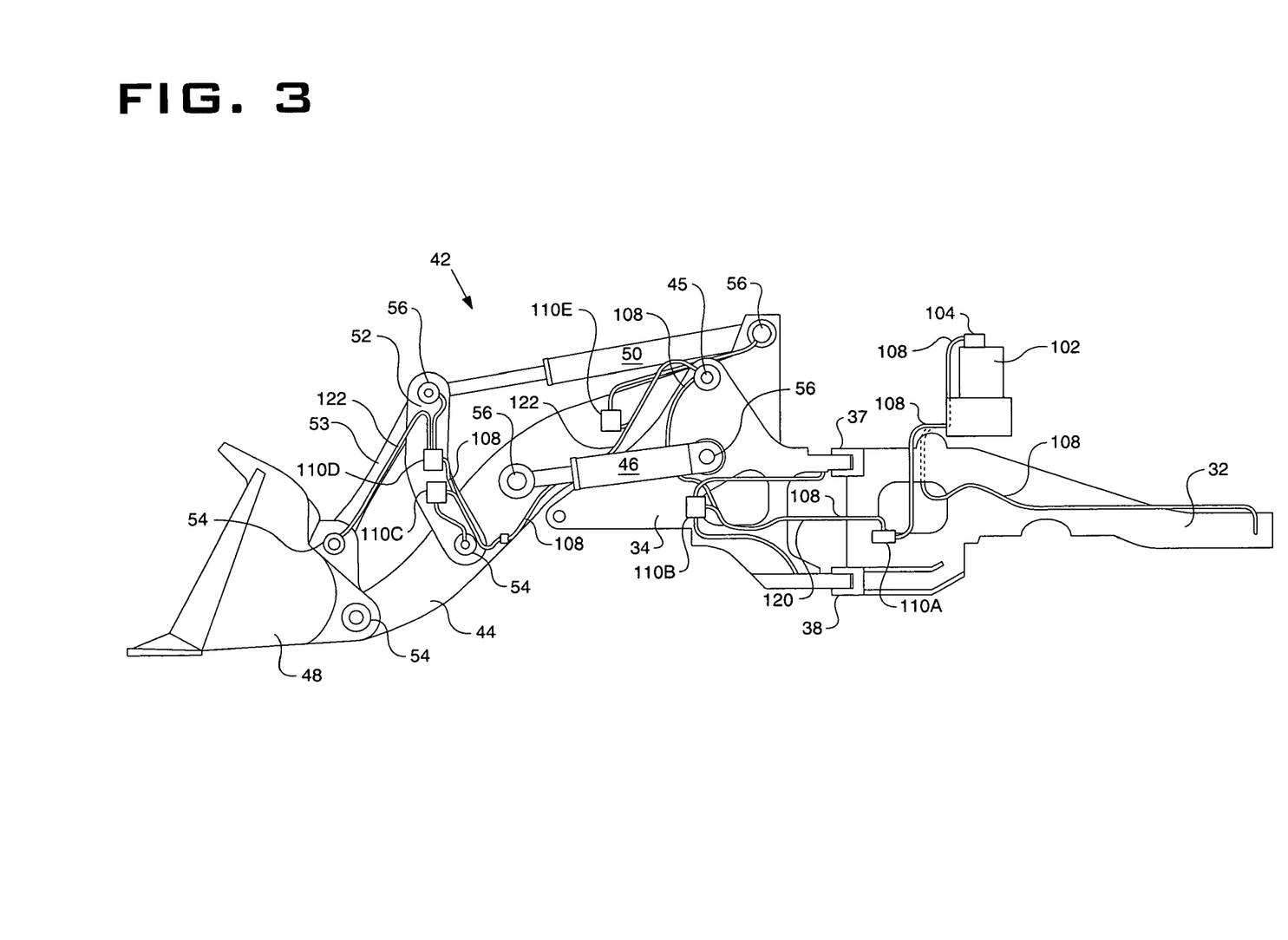
FIG. 3 is a side view of one example of a frame and associated linkage assembly for a wheel loader.

The present disclosure provides a lubrication system and method of controlling a lubrication system for any mobile machine. An exemplary embodiment of such a machine 30, a wheel loader, is illustrated in FIGS. 2-3. However, the term "machine" may refer to any mobile machine that performs some type of operation associated with an industry such as mining, construction, farming, transportation, or any other industry known in the art. For example, machine 30 may be an earth moving machine such as a wheel loader, excavator, dump truck, backhoe, motorgrader, material handler or the like.

Machine 30 may include an engine end frame 32 and a non-engine end frame 34 connected at an articulation joint 36. The articulation joint or hitch 36 may include an upper and lower articulation joint 37,38, as shown in FIG. 3. A pair of steering cylinders 39 may be mounted between frame members 32,34 on opposite sides of the machine to provide steering. The engine end frame 32 may support, for example, a power source and cooling system components (not shown), the power source being operatively connected through a drive train (not shown) to drive traction devices 40 for movement of the machine 30. The traction devices 40 may include one or more wheels located on opposing sides of the machine 30. Alternatively, traction devices 40 may include tracks, belts, or other traction devices 40 known in the art. Machine 30 may also include an operator station or cab 41 for primary control of the machine 30 during ordinary operations.

The machine 30 may also include an implement system including a linkage 42. The linkage 42 may include a boom 44 connected to the non-engine end frame 34 at pivot point 45 for pivotal movement that raises the linkage 42 from lowered position 58 to raised position 60, actuated by one or more lift cylinders 46. A bucket 48 or other implement may be pivotally connected to an end of the boom 44. Tilting of the bucket 48 is accomplished via a tilt cylinder 50, through tilt lever 52 and bucket link 53, and includes tilt pivot points 54. The ends of each hydraulic cylinder 39, 46, 50 are also typically attached, collectively, at pivot points 56. The term "linkage," as used herein, shall refer to any structure that is used to support an implement in relation to the frame of a machine, including, without limitation, those commonly found in connection with wheel loaders and excavators. A variety of linkage arrangements are well known to those of skill in the art. Implements may be employed for a variety of tasks, including, for example, loading, compacting, lifting, brushing, and include, for example, buckets, compactors, forked lifting devices, brushes, grapples, cutters, shears, blades, breakers/hammers, augers, and others.

Figure 4:
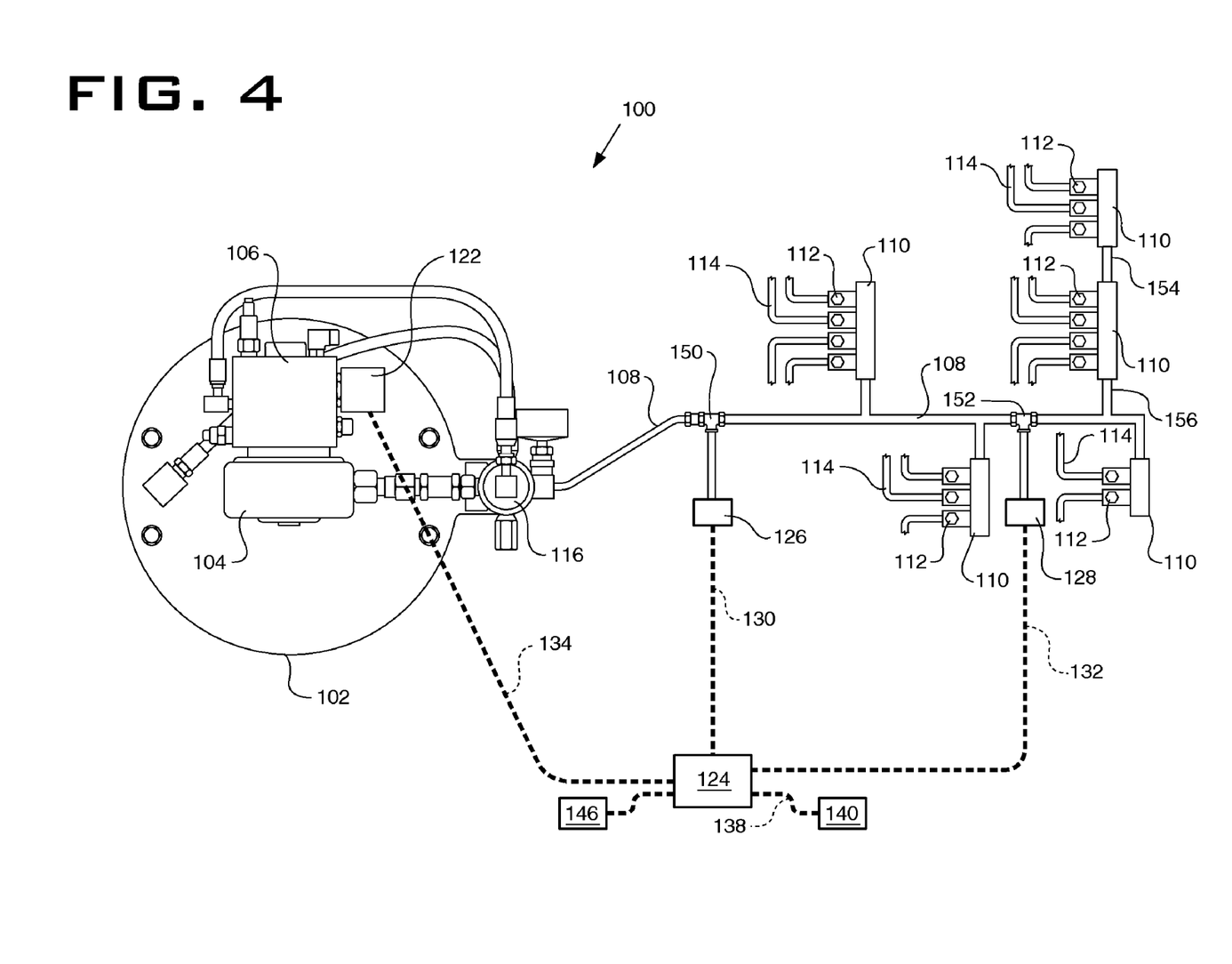
FIG. 4 is a diagrammatic view of one embodiment of the present disclosure.

One exemplary illustration of a lubrication system 100 consistent with one embodiment of the present disclosure is shown in FIG. 4. The system generally includes a pump 104 driven by a hydraulic motor 106, the pump 104 being fluidly connected to deliver lubricant from a tank 102 along supply line 108 to one or more injector banks 110. The injector banks 110 include two or more injectors 112 that supply a quantity of lubricant through feed lines 114 to the various lubrication points on the machine 30. Alternatively, supply line 108 may feed one or more individual injectors, or may feed one or more lubrication points directly, as opposed to banks of injectors 110 as shown.

The pump 104 may be pneumatically powered, hydraulically powered (as shown), or electrically powered, connected to either an air system, a hydraulic system, or an electrical system on the machine, respectively, by a power supply line (not shown) as known in the art.

The pump 104 and tank 102 may be located on a machine platform as depicted in FIG. 2. Referring to FIG. 3, in one embodiment, the pump 104 is disposed atop tank 102, with supply line 108 extending to a first injector bank 110A that is connected (connection not shown) to supply lubricant to pivot points 56 of the steering cylinders 39 (FIG. 2). Supply line 108 continues to a second injector bank 110B on the non-engine end frame 34 that supplies lubricant to upper and lower articulation joints 37,38. Supply line 108 includes a first portion 120 which extends along the frame members 32, 34, and a second portion 122 which continues along the linkage to injector banks 110C, 110D and 110E which may supply lubricant to the lift pivot points 45, tilt pivot points 54, and tilt and lift cylinder pivot points 56.

Lubrication points which may be supplied by such a system may include, without limitation, wheel bearings, articulation joints, cylinder connections, linkage joints, or rear axle oscillation joints. Other applications are well known to those of skill in the art.

Figure 6A:
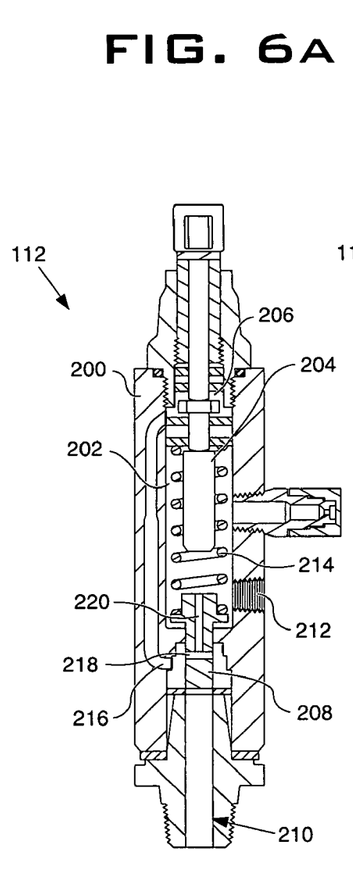
FIGS. 6A-D are cross-sectional views of one type of pressure actuated injector.
Figure 6B:
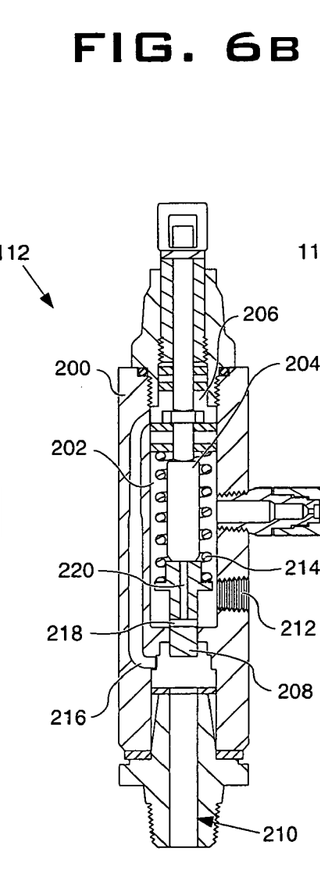
Figure 6C:
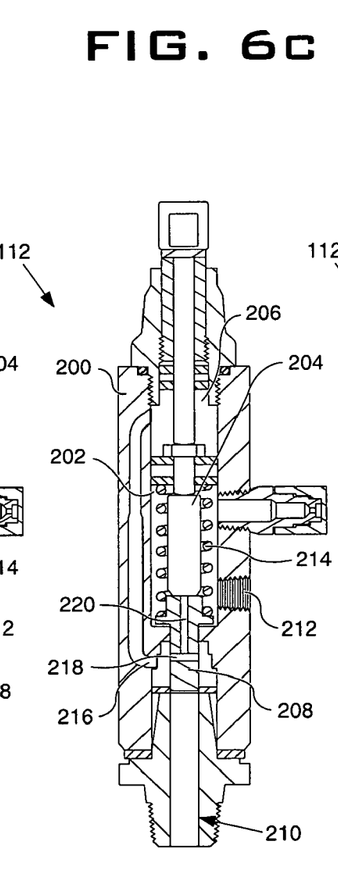
Figure 6D:
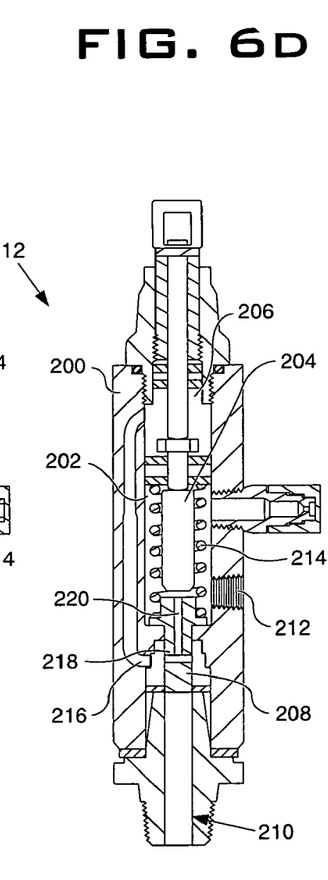

In one embodiment, the supply line 108 feeds one or more injectors 112, or bank of injectors 110 capable of metering a specific amount of lubricant to the associated lubrication point. In a preferred embodiment, the injectors 112 are pressure actuated, such as those sold under the designation SL-1 offered by Lincoln Industrial Corporation, shown in FIGS. 6A-D. Each injector 112 includes generally a housing 200 with a measuring chamber 206, central discharge chamber 202, piston 204, and slide valve 208. In a first cycle position (rest position), shown in FIG. 6A, the discharge chamber 202 is filled with lubricant from a previous cycle. Pressure of lubricant coming through inlet 210 forces slide valve 208 upwards against the bias of spring 214 to a second cycle position, shown in FIG. 6B. In FIG. 6B, lubricant passes through now open passage 216 to measuring chamber 206. As fluid fills the measuring chamber 206, piston 204 is forced downward (FIG. 6C), forcing lubricant within the discharge chamber 202 through outlet port 212. As piston 204 completes its stroke, slide valve 208 closes off passage 216. At this stage, the piston 204 remains in position until pressure on the bottom of valve 208 from the supply line (not shown) attached to the outlet 212 is relieved. Once this happens, the compression spring 214 forces the valve downward to the position shown in FIG. 6D, at the same time forcing the piston 204 upward. The upward force of piston 204 causes the lubricant from the measuring chamber 206 to pass in a reverse direction through passage 216, and through now open port 218 of the valve 208 through conduit 220, to refill the discharge chamber 202. When pressure again builds in the attached supply line, the valve 208 returns to the first position shown in FIG. 6A, and the cycle restarts.

Accordingly, for pressure-actuated valves such as that just described, it is necessary for proper injector operation that a first pressure is reached and sustained in the supply line at the injector position to achieve full discharge. After which, pressure must released to reset the injectors. For example, the injector 112 may discharge and refill the measuring chamber 206 when the pressure is above 1850 psi, and reset when the pressure drops below 500 psi.

For control of the lubrication systems of the present disclosure, referring again to FIG. 4, provided is a first pressure sensor 126 and a second pressure sensor 128, which generate pressure signals 130 and 132, respectively, which are communicated to a controller 124 that controls operation of the system 100. In one embodiment, the pressure sensors 126,128 are of a type producing a voltage signal being directly proportional to pressure level, however, other types of pressure sensors could be used without departing from the scope of the disclosure.

In one embodiment, the first pressure sensor is located adjacent to the pump 104, thereby providing a pressure signal that is useful to both control operation of the system 100 with respect to the downstream pressure, and to protect against excessive pump pressure. In one embodiment, the second pressure sensor is disposed along the first portion 120 of the supply line associated with the non-engine end-frame 34.

Controller 124 receives the signals 130,132 from sensors 126,128 and responsively produces an output signal 134 that controls the lubrication system 100. Controller 124 may be configured to determine whether the system is operating properly, and when the necessary pressure at specific downstream injectors has been achieved. "Downstream," as defined herein, refers to the direction of flow of lubricant away from the pump along one or more supply lines. In one embodiment, the controller is configured to generate control signal 134 to control operation of system 100 via activation or deactivation of the motor 106 via solenoid valve 122. When solenoid valve 122 is open, fluid (pneumatic or hydraulic) is supplied to the motor 106, driving pump 104, and the system is charging. For electric pumps, flow of electricity may be controlled to achieve the same effect.

Energizing the solenoid-actuated valve 122 may close vent valve 116, allowing lubricant to flow under pressure from the pump 104 through supply line 108. Deactivating the solenoid 122 shuts off flow/power to the motor 106 and opens vent valve 116, allowing lubricant from the supply line 108 to flow in a reverse direction into tank 102, relieving pressure within the system.

In one embodiment, controller 124 is a computer including a microprocessor, and may be one of many readily available computers capable of processing numerous instructions. The computer may also include multiple processing units configured in a distributed structure environment for forming a system. However, other suitable controllers are known in the art, any one of which could be readily used in connection with alternative embodiments of the present disclosure. A specific program code can be readily and easily written from the flowchart shown in FIG. 7, in the specific assembly language or microcode for the selected microprocessor.

In one embodiment, the controller 124 not only controls the lubrication system 100, but also serves to control, monitor, and/or diagnose other electronic systems associated with the machine 30. As such, the controller 124 may be adapted to receive sensor and other input from a variety of sources throughout the machine, in addition to the pressure sensors 126, 128 of the lubrication system 100.

In one embodiment, system 100 is adapted to automatically lubricate the various lubrication points at pre-determined intervals, assuming that the pressure parameters have been met. For example, the controller may include a timing mechanism that initiates the lubrication cycle every 5-10 minutes. It is also preferred that the operator may initiate lubrication manually through an operator interface 146 which may be located, for example, in the operator cab 41, or at a remote location on the machine 30, such as near the pump 104. Such manual operation may be useful, for example, when performing diagnostics on the lubrication system 100. "Manual" operation may be provided through signals sent through the sensor or directly to one or more system 100 components. For example, a signal may be sent directly from an operator switch or other device to energize solenoid 122.

In yet another embodiment, controller 124 may be configured to control the lubrication system 100 based on other operating parameters. That is, the system may be configured so that the lubrication system 100 is activated only when lubrication is necessary, thus conserving energy and lubricating fluid. The operational parameter may differ for each type of machine. For example, on large off-highway mining trucks, the operational parameter may be machine movement, with sensors providing input relating to the speed/movement of the machine. Alternatively, the sensor may be associated with the transmission or final drive, or other powertrain components. On other machines, such as hydraulic excavators or loaders, the operational parameter may be movement of the linkage assembly. That is, a sensor may be provided that generates a signal indicating that the linkage is in operation, wherein lubrication is desired for the lubrication points associated therewith. These additional parameters may define when or how often the lubrication cycle is initiated.

The controller 124 is preferably connected to an indicator device 140, which may be located within the operator compartment 41 of the machine. Indicator device 140 may include a display for communicating various warning conditions to the operator and to provide other indications of machine configuration and performance. In one embodiment, the indicator device 140 includes a message area for providing text information to the operator or service personnel. The message area is thereby capable of indicating quickly and efficiently whether the system is operating properly, and the nature of any fault condition for any monitored parameter. For example, the controller may provide a low pressure warning, high pressure warning, provide an indication, either numerical or otherwise, of the pressure at either the locations of the pressure sensors, or at another location of the supply line based upon the algorithm disclosed herein, or may provide a representation, numerical or otherwise, of a pressure differential between various points in the supply line. Alternatively, the indicator device 140 may indicate that the system is operating properly, by providing, for example, an indication that the system is operating, and/or that a lubrication cycle has been successfully completed.

Advantageously, the system includes an operator interface 146 allowing the operator (which may be considered to include service personnel, manufacturers or any other individuals that may desire to modify machine operational parameters) to enter operational codes and other information to configure or otherwise affect the operation of the controller. For example, the interface 146 may allow the operator to set the maximum pump pressure, desired pressure that needs to be attained at any of the pressure sensors or at any other position in the supply line, adjust the buffer pressure, or adjust a time interval between lubrication cycles, firing of the injectors or any other time interval required for operation of the specific algorithm provided.

Figure 7:
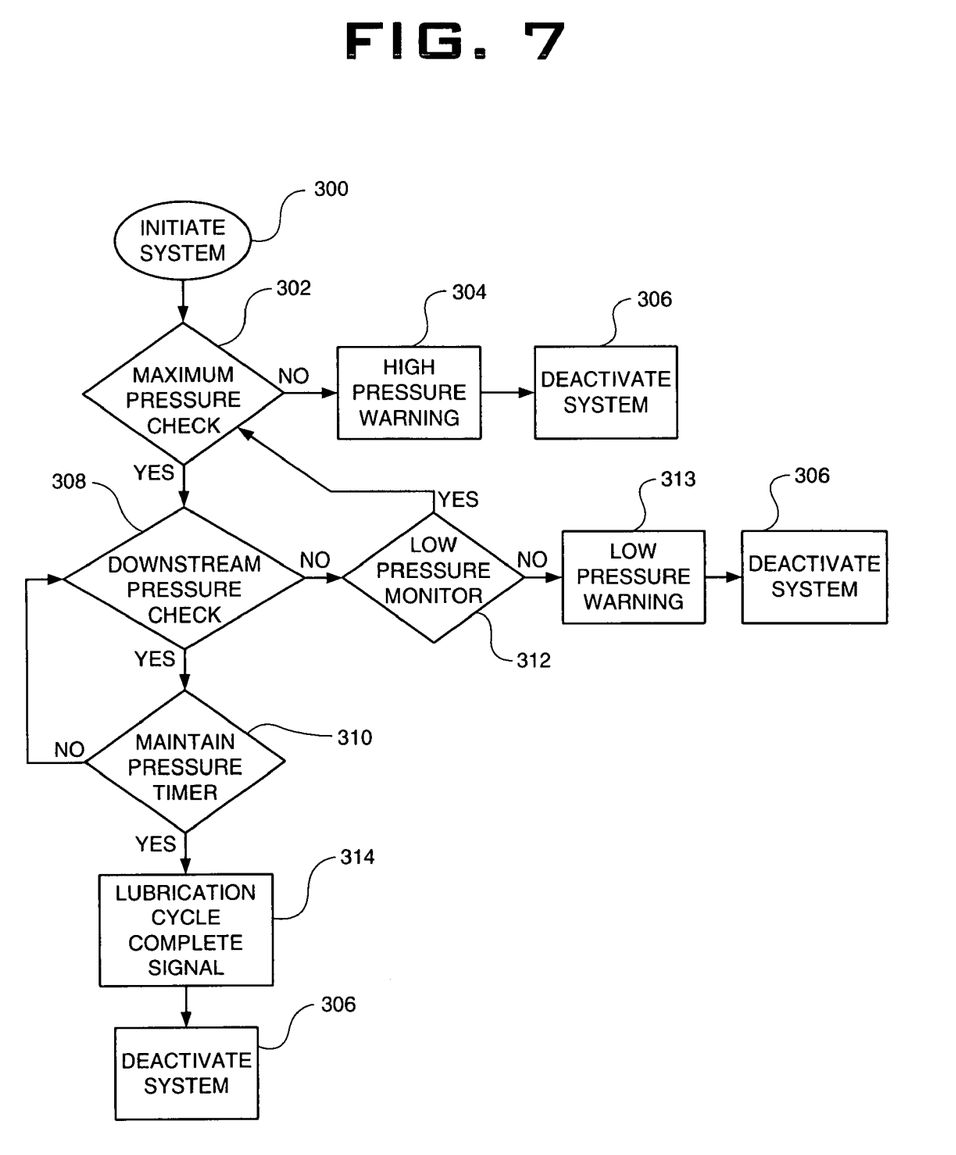
FIG. 7 is a flow chart of an algorithm of one embodiment of the present disclosure.

Operation of the lubrication system 100 is more fully understood by reference to the exemplary flow chart shown in FIG. 7. The system 100 initiates 300 the lubrication cycle, for example, at machine start-up, after a desired time interval, or upon command by an operator (manual start-up). For example, the controller 124 may be programmed to initiate the lubrication cycle every 10-15 minutes. As will be readily appreciated by one of skill in the art, the interval between cycles may be determined based on the needed frequency of lubrication for one or more machine components, the time necessary for injectors to reset, and other factors. The necessary frequency of lubrication may also be determined by the controller 124 dependant upon operational parameters of the machine, such as time of operation, movement of the machine, and or use of the linkage.

The controller 124 then proceeds to perform a pump pressure check 302. In one embodiment, the system 100 will include a pressure sensor 126 associated with the supply line 108 adjacent to the pump 104. For example, the sensor may be located immediately at the pump outlet, or within two feet of pump 104 along the supply line 108. Thus, the pressure sensor 126 provides an indication of the pump pressure. The pressure sensor 126 may also employed in connection with the determination of a downstream pressure condition as will be later described (shown in FIG. 4) or, alternatively, a separate pressure sensor may be provided to monitor pump pressure.

At 302, (indicated by a "No" or failed check) if the pressure associated with the first position 150 exceeds a desired maximum pump pressure, the controller 124 may provide a high pressure warning signal 304 to the operator and/or deactivate 306 the system by, for example, shutting off the pump 104 and/or venting the supply line 108 to the tank 102. This may be employed in lieu of a pressure regulator or other mechanical pressure limiting device. The maximum pump pressure check 302 may allow operation of the pump at an optimal maximum pressure while eliminating adjustment of a pressure regulator and variation in system operation that can occur with such adjustments (as found in prior art systems). The maximum pressure check may also function to avoid damage to the pump 104, valves, lines or other system components. For example the warning signal 304 may be provided and/or the system deactivated 306 if the pressure exceeds 3800-4000 psi for a time interval T1, the time interval T1 being provided to avoid false warnings in the event of pressure spikes, for example, 0.5 seconds. In one embodiment, the typical operating range is 2900-3000 psi. Optionally, the system my provide a warning signal 304 when the pressure exceeds a first pressure, for example 3000 psi, for 0.5 seconds, followed by shutting down the system 100 at 3800 psi.

In conventional systems, a pressure relief valve is typically provided to protect the machine and system components from excessive pressure build-up. For example, if the system exceeds 4000, psi, the system may relieve pressure through a pressure relief valve by allowing lubricant to escape onto the machine or into the operating environment. By employing the pump pressure check 302, the disclosed system avoids these typically undesirable consequences. However, it may be desirable to include a pressure relief valve as a back-up to the pump pressure check 302.

Once the initial pump pressure check 302 is successfully completed (indicated by a "yes" response to 302), the system 100 then determines whether a desired downstream pressure has been achieved via pressure check 308. As shown in FIG. 4, the system 100 includes a first pressure sensor 126 and a second, downstream pressure sensor 128. The signals 130, 132 from these sensors 126,128 are employed by the controller 124 to control the system based upon a pressure differential $D_1$ that exists between a first position of the supply line 150 and a second position of the supply line 152. Based on the pressure differential $D_1$ between these two positions 150, 152, the controller 124 is configured to determine whether a downstream pressure at a third position 154 or 156, for example, at or near one of the injectors or injector banks, has been achieved.

This may be determined, for example, according to the following equation:

$$(DF/DR) \times (P_1 - P_2) < (P_2 - P_3), \tag{1}$$

where $P_1$ is the pressure at a first position 150; $P_2$ is the pressure at the second position 152 downstream of the first position 150 and pump 104; and $P_3$ is the desired pressure at a third position 154,156 downstream of the second position. (DF/DR) is the ratio of the experimentally determined front pressure drop and rear pressure drop (with front referring to the upstream drop between the first 150 and second positions 152, and rear referring to the downstream pressure drop between the second position 152 and the third position 154, 156). The system therefore employs the differential $D_1$ between the pressure at the first position $P_1$ and the pressure at the second position $P_2$ to control the system ($D_1 = P_1 - P_2$). The differential $D_1$ is modified by the drop ratio DF/DR, and compared to the pressure differential $D_2$ between the pressure at the second position $P_2$ and a desired pressure $P_3$ at a downstream third position 154,156, to determine when the desired downstream pressure $P_3$ has been achieved.

In one embodiment of the present disclosure, the experimentally measured pressure drop DF from the first position 150 to the second position 152 will be substantially equivalent to the pressure drop DR from the second position 152 to the desired third position 154,156. In which case, the equation would be as follows:

$$(P_1-P_2)<(P_2-P_3) \quad (2)$$

However, in many applications, the pressure drop DF from the first position 150 to the second position 152, and the pressure drop DR from the second position 152 to the third position 154,156 will not be equal. As such, the differential pressure $(P_1-P_2)$ needs to be modified by the drop ratio (DF/DR) as shown in equation 1. The drop ratio can be obtained through actual testing of the system, for example, by placing a pressure sensor at the third, desired position 154,156 on a test machine, obtaining actual pressures for $P_1$, $P_2$ and $P_3$, and calculating the actual pressure drops between the various positions.

$P_3$ is the desired pressure at a specific downstream location of the supply line 108 that, in one embodiment, is the location of an injector or injector bank 110. For example, the desired pressure $P_3$ may be approximately 1850 psi, the actuating pressure of one example of a pressure-actuated injector (FIGS. 6A-6D) in accordance with one embodiment of the present disclosure.

The desired pressure $P_3$ may, however, also include a buffer pressure added for further assurances that the minimum pressure necessary for firing the injector(s) 112 has been achieved. For example, the buffer pressure may be 200 psi, making the desired pressure in the above example 2050 psi. "Desired pressure" as defined herein, may therefore include the actual pressure desired at a specific third position (e.g., 154 or 156) of the supply line, or the actual desired pressure modified by a buffer pressure.

Pressure check 308 will occur periodically, for example, every 0.015 seconds until such time as the determination is made that the pressure condition as set forth by, for example, equation 1 or 2 has been satisfied (indicated by a "yes" response to 308).

Assuming that a successful pressure check 308 does not occur (indicated by a "no" response to 308), the system also includes a low pressure monitor 312 which includes a timing mechanism for monitoring the length of time the system 100 has been activated. If the downstream pressure condition has not been achieved (indicated by a "no" response to 308) by a desired period of time T2, the controller may be configured to send either a low-pressure warning 313 and/or to deactivate the system 306. Thus, controller 124 may be configured to determine that the lubrication cycle was unsuccessful, and to alert the operator through indicator device 140. For example, the controller may be configured to deactivate the system 306 and send a low pressure warning 313 after 120 seconds. Alternatively, the low pressure warning 313 may be delivered, for example, after 120 seconds, and the system deactivated 306 after 180 seconds.

If the low pressure check (312) has not exceeded the time T2, but the downstream pressure condition has not been achieved (indicated by a "yes" response to 312) the system enters a loop back to the maximum pump pressure check (302). The loop continues until either the time period T2 for the low-pressure warning has been exceeded, or the downstream pressure condition has been met. Thus, the system provides for continual monitoring of the pump pressure while pressure is building to meet the desired downstream pressure condition.

In an alternative embodiment, the system may include various warning levels. For example, if the pressure condition is satisfied, but is only achieved after a long delay, for example, 120 seconds, a signal may be sent to indicate that the system 100 should be serviced shortly. If the system takes over, for example 160 seconds, the system may signal a warning for immediate maintenance. Finally, after, for example, 180 seconds, the system sends a warning and deactivates 306 the system.

Assuming that the determination 308 has been made that the desired pressure $P_3$ has been attained (indicated by a "yes" response to 308), the controller 124 may then be configured to determine 310 whether the desired pressure is maintained for a set period of time T3. The timing mechanism further ensures that the desired pressure has been achieved and that the injector(s) 112 have fully fired. For example, it may be desirable to maintain the desired pressure for 0.5 to 30 seconds. In one embodiment, no more than 0.5 seconds is required. Once the desired pressure $P_3$ has been achieved for the necessary period of time T3, the system will then deactivate 306, and may relieve the pressure in supply line 108 to allow the injectors to reset. Optionally, the controller 124 may include step 314 wherein a signal is sent to an indicator device 140 to inform the operator that the lubrication process has been successful.

Figure 5:
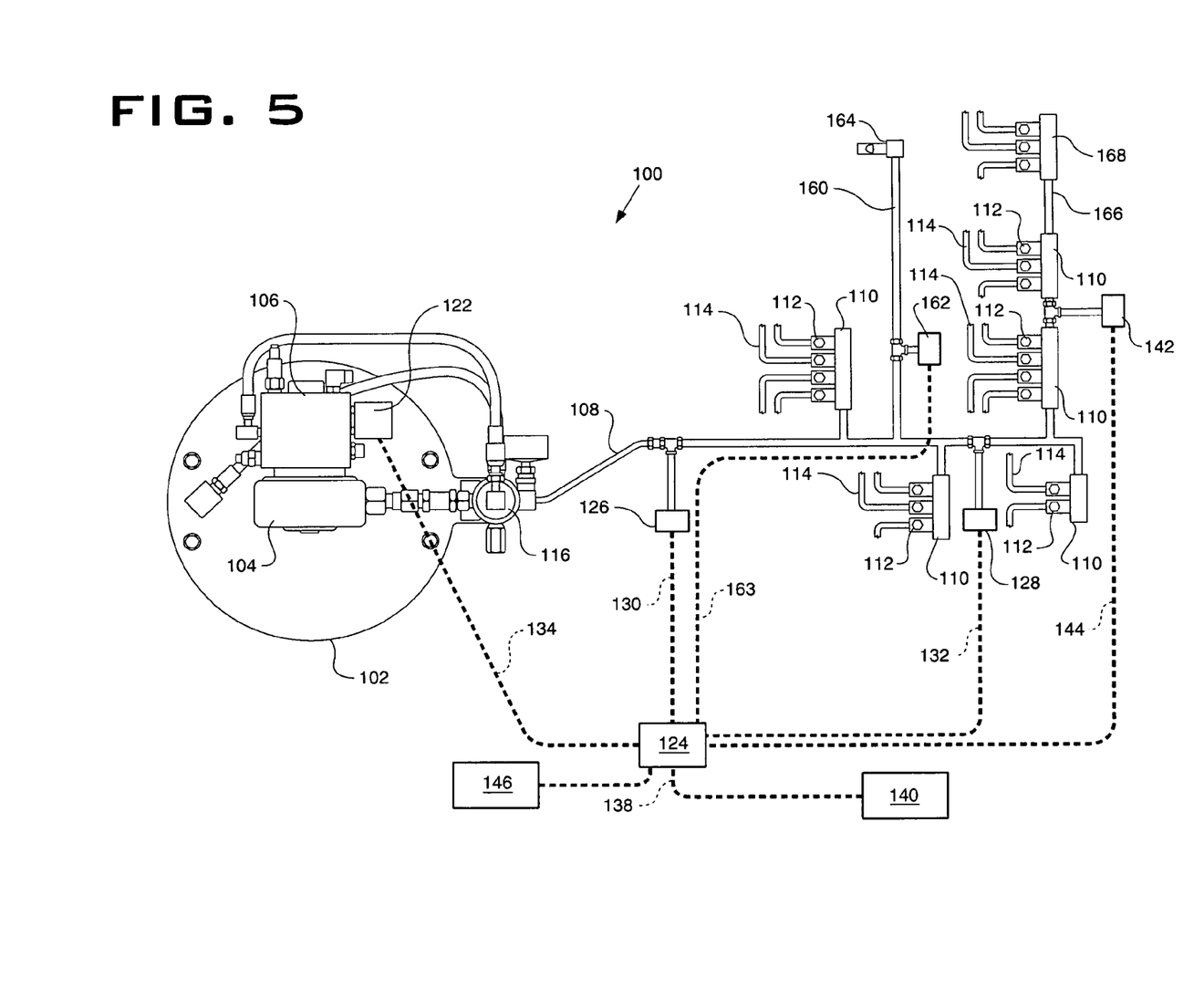
FIG. 5 is a diagrammatic view of another embodiment of the present disclosure.

In another embodiment, shown in FIG. 5, the system 100 may include a supply line that has two or more branches 160, 166, and there may be a need to separately determine when a desired downstream pressure for each of these branches has been achieved. For example, to determine when a desired pressure $P_3$ at single injector 164 or injector bank 168 has been achieved. In this case, the system may employ a single first pressure sensor 126 and two separate second pressure sensors 162, 142. That is, the differential $D_1$ for the first determination (for injector 164) may be the differential between the pressure detected by sensor 126 and sensor 162, while a second, separate determination (for injector bank 168) is made by employing the differential $D_1$ between the pressure detected by sensor 126 and sensor 142. Alternatively, the determination for the position associated with injector 168 may employ the pressure differential $D_1$ between the pressures at sensors 128 and 142. Other arrangements should be readily apparent to one of skill in the art.

While aspects of the present disclosure have been particularly shown and described with reference to the embodiments above, it will be understood by those skilled in the art that various additional embodiments may be contemplated without departing from the spirit and scope of the present disclosure. Such embodiments should be understood to fall within the scope of the present invention as determined based upon the claims below and any equivalents thereof.

INDUSTRIAL APPLICABILITY

Machines such as large off-highway mining trucks, wheel and track-type loaders, motor graders, material handlers and hydraulic excavators include various parts and joints that require frequent lubrication. For example, wheel bearings, articulation joints, oscillation joints and implement linkages often must be frequently lubricated to extend the operational life of the machine and prevent premature failures. Embodiments of the present disclosure are useful in such machines to automatically and accurately lubricate such points. In one embodiment, a controller is provided to receive pressure signals from at least two pressure sensors in a supply line, and to use the differential pressure between these two positions to determine when a pressure condition at a downstream position has been met. This is particularly useful when placing a pressure sensor at or near the specific downstream position is impractical due to operating conditions that would damage such sensors.

The systems of the present disclosure may also include a warning system to alert the operator and/or shut down the system when the maximum operating pressure has been exceeded, thereby protecting components of the system and preventing lubricant from being ejected from the system via pressure control valves onto the machine and into the environment.

To make certain that the system is operating properly, the system may also provide system information, such as diagnostic information, to the operator or service personnel. This information may include, without limitation, indications that the lubrication cycle has been successfully completed, that the pump pressure is too high, that the desired pressure at particular points of the supply line has not been met, or that lubrication has not been achieved.

Other aspects, objects, and advantages of the present disclosure can be obtained from a study of the drawings, disclosure and the appended claims.

What is claimed is:

1. A lubrication system, comprising:
   a pump operatively connected to at least one supply line to deliver a lubricant;
   a first pressure sensor associated with the supply line at a first position, the first pressure sensor generating a first pressure signal indicative of a first pressure;
   a second pressure sensor associated with the supply line at a second position downstream of the pump and the first position, the second pressure sensor generating a second pressure signal indicative of a second pressure; and
   a controller configured to receive said first and second pressure signals and to control operation of the pump based upon a differential pressure between the first and second pressures.

2. A system according to claim 1, wherein the supply line has a third position located downstream of the first and second positions, the controller being configured to control operation of the lubrication system dependant upon determining when a desired third pressure at the third position has been achieved based upon the differential pressure.

3. A system according to claim 2, further comprising at least one pressure-actuated injector disposed in the supply line in the proximity of the third position.

4. A system according to claim 2, further comprising an operator interface operable for setting the desired third pressure.

5. A system according to claim 2, further comprising an indicator device operable to provide system pressure information.

6. A system according to claim 5, wherein the system pressure information is provided as one of a low pressure warning indication, a representation of a calculated pressure at the third position, and a representation of the differential pressure.

7. A system according to claim 2, wherein the distance along the supply line from the first position to the second position is approximately equal to the distance between the second position and the third position.

8. A system according to claim 1, further comprising an indicator device operable to provide system pressure information.

9. A system according to claim 8, wherein the system pressure information is provided as one of a low pressure warning indication, a representation of a calculated pressure at a third position of the supply line, and a representation of the differential pressure.

10. A system according to claim 1, wherein the first position is adjacent to the pump.

11. A system according to claim 10, wherein the controller is configured to deactivate the pump if the first pressure exceeds a maximum pump pressure.

12. A method of operating a lubrication system pump to direct a flow of lubricant along a supply line, the method comprising the steps of:
    sensing a first pressure at a first position of the supply line;
    sensing a second pressure at a second position of the supply line downstream of the pump and the first position; and
    generating a control signal from a controller to control operation of the pump dependant upon a first differential pressure between the first and second pressures.

13. The method of claim 12, further including determining a third pressure at a third position of the supply line based upon the first differential pressure, the control signal being generated to deactivate the pump dependant upon whether the third pressure has achieved a desired pressure.

14. The method of claim 12, wherein the step of generating a control signal includes the steps of:
    determining the first pressure differential by subtracting the sensed second pressure from the sensed first pressure;
    determining a second pressure differential by subtracting a desired pressure from the sensed second pressure; and
    comparing the first pressure differential to the second pressure differential.

15. The method of claim 12, wherein the first position is adjacent to the pump, the method further including a step of deactivating the pump when the first pressure has met a maximum pump pressure.

16. The method of claim 14, further including the step of modifying the first pressure differential by a drop ratio.

17. A machine comprising a lubrication system further including
    a frame having a linkage extending outwardly from the frame;
    a pump operatively connected to at least one supply line, wherein the supply line includes a first portion that extends along the frame and a second portion that extends along the linkage;
    a first pressure sensor associated with the first portion of the supply line at a first position, the first pressure sensor generating a first pressure signal indicative of a first pressure;
    a second pressure sensor associated with the supply line at a second position downstream of the pump and first position, the second pressure sensor generating a second pressure signal indicative of a second pressure; and
    a controller configured to receive the first and second pressure signals and to control operation of the pump based upon a differential pressure between the first and second pressures.

18. A machine according to claim 17, wherein the supply line has a third position located along the second portion of the supply line, the controller being configured to control operation of the pump dependant upon determining when a desired third pressure at the third position has been achieved based upon the differential pressure.

19. A machine according to claim 18 further comprising an operator interface operable for setting the desired third pressure.

20. A machine according to claim 17, wherein the first position is located adjacent to the pump, the controller configured to deactivate the pump when the pressure at the first position has met a maximum pump pressure.

* * * * *